(No Model.)
G. WESTINGHOUSE, Jr.
MEANS FOR DETECTING LEAKS IN GAS MAINS.
No. 312,541. Patented Feb. 17, 1885.
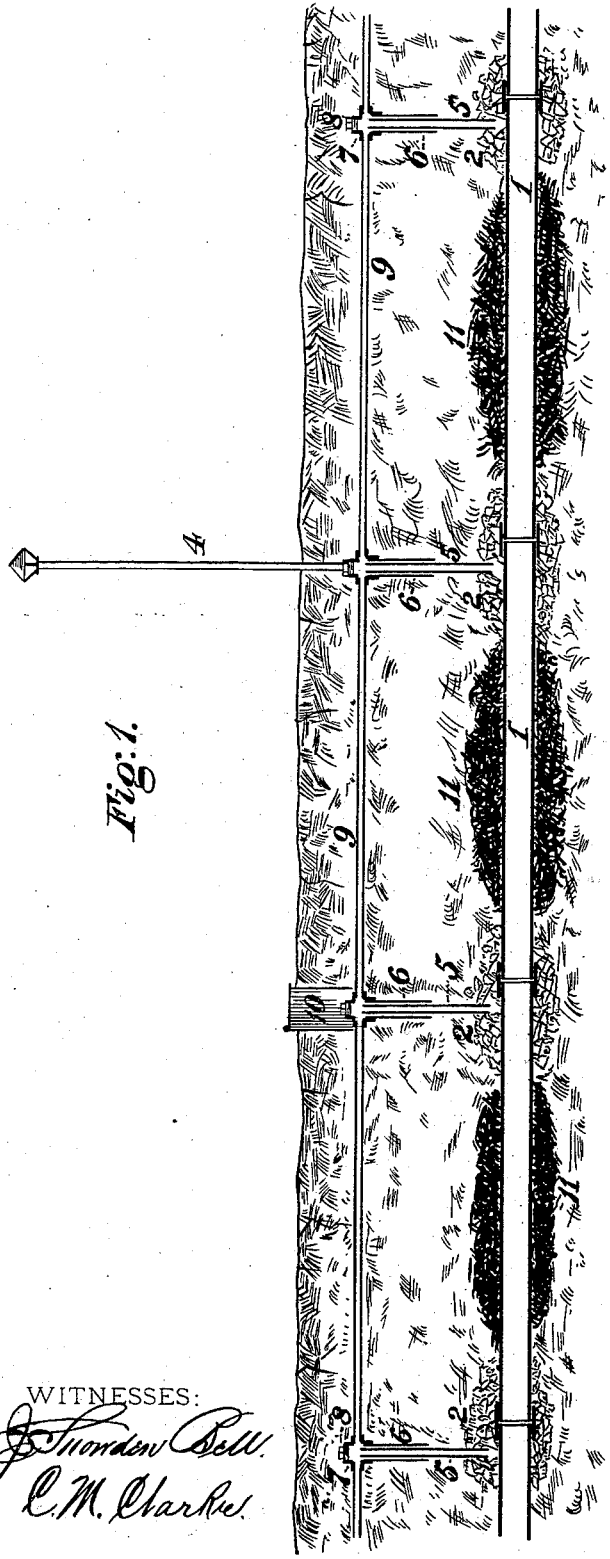
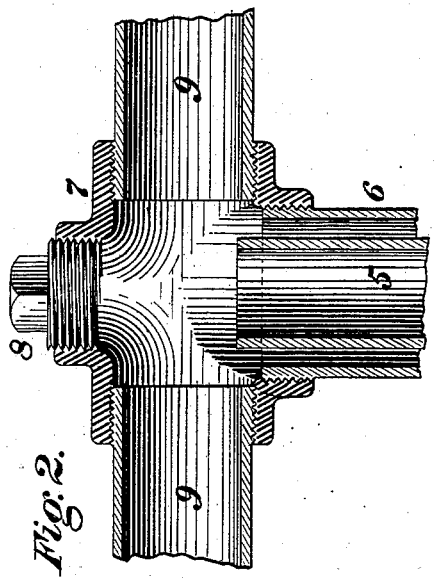
WITNESSES:
INVENTOR.
George Westinghouse Jr.
BY George H. Christy
ATTORNEY.

UNITED STATES PATENT OFFICE.

GEORGE WESTINGHOUSE, JR, OF PITTSBURG, PENNSYLVANIA.

MEANS FOR DETECTING LEAKS IN GAS-MAINS.

SPECIFICATION forming part of Letters Patent No. 312,541, dated February 17, 1885.

Application filed January 21, 1885. (No model.)

*To all whom it may concern:*

Be it known that I, GEORGE WESTINGHOUSE, Jr., a citizen of the United States, residing at Pittsburg, in the county of Allegheny and State of Pennsylvania, have invented or discovered certain new and useful Improvements in Means for Detecting Leaks in Gas-Mains, of which improvements the following is a specification.

In the accompanying drawings, which make part of this specification, Figure 1 is a longitudinal central section through an underground gas-main with my improvements applied, and Fig. 2 a similar section on an enlarged scale through one of the couplings of the waste-gas-conducting-pipe line.

My present invention relates to improvements of the class exemplified in Letters Patent of the United States, No. 306,556, granted and issued to me under date of October 14, 1884; and its object is to enable leakage or escape of gas to be detected within determined lengths of a line of gas-main without the necessity of excavating entirely down to the main or providing a separate detector-pipe at each of the points at which it is possible for leakage to occur.

To this end my invention, generally stated, consists in the combination, with an underground gas-main, of a line of waste-gas-conducting pipe, a series of leakage-pipes, each leading from a point adjacent to the main to a socket in the conducting-pipe, and a pipe leading from the conducting-pipe to a point of discharge above the surface of the ground.

The improvements claimed are hereinafter fully set forth.

In my Letters Patent No. 306,556, above referred to, the detection of leakage in an underground gas-main was provided for by the employment of a series of detector-pipes, each leading from a point adjacent to a joint or connection of the main, or other points in its length at which leakage might be apprehended, to a point above the surface of the ground at which leakage, if any, could be discovered by the application of a light to the open end of the detector-pipe. In many instances the use of a separate detector-pipe protruding above the surface of the ground at each point of probable leakage is inconvenient or impracticable, and under my present invention I enable a single detector-pipe to serve for indicating the existence of leakage within any desired portion of the length of the main, while affording facilities for readily locating the point or points within such length at which the leakage may occur.

In the practice of my invention a line of waste-gas-conducting pipe, 9, of small diameter relatively to the main 1, through which gas is conveyed, but sufficiently large to carry away any ordinary leakage without accretion of pressure, is laid at such level below the ground as to be conveniently accessible, the line 9 being divided into sections of any desired length—as, for instance, one or more blocks in cities, or the width of fields or inclosures in country districts—and such division may be effected either by the use of suitable plugs or cocks in a continuous line or by closing the ends of each section and laying the same independently of the adjacent sections.

T-couplings 7 are interposed between the lengths of pipe of the waste-conducting line 9 at points above the several joints or branch-line connections of the main 1, or other locations in the length thereof, at which it is considered that leakage is liable to occur, each of said couplings having a removable screw cap or plug, 8, in its top, and a downwardly-projecting socket-pipe, 6, which is open at both ends, is secured in its opposite side, said socket-pipe extending downwardly in the direction of the main 1. A leakage-pipe, 5, is fitted freely within each of the socket-pipes 6, and extends from the conducting-pipe 9 to a point adjacent to a joint or branch connection of the main 1, so as to be adapted to carry any leakage therefrom into the line 9.

It will be obvious that the socket-pipes 6 may, if desired, be dispensed with, and the leakage-pipes be led directly into the couplings; but the employment of the socket-pipes is advantageous in affording an additional inlet for leakage to the conducting-pipe. Further, the employment of the socket-pipes enables the location of the leakage-pipes for different required depths to be readily effected without requiring adjustment or permanent connections.

A detector and escape pipe, 4, is connected to each section of the line of conducting-pipe 9 at any convenient point in its length, preferably by being secured to one of the couplings 7, and extends therefrom to a point above the level of the ground conveniently accessible for testing any inflow of gas to the conducting-pipe 9 through either of the several leakage-pipes 5 or socket-pipes 6 passing out through the detector-pipe, and being ignited upon the application of a light to the outer end thereof. The detector-pipe may be further provided, if desired, with a small jet, which can be kept constantly lighted and serve as a street-lamp, and any excess in its flame will indicate a corresponding increase of leakage. The detector-pipes may be passed up through lamp-posts when the same are located sufficiently near to the line of the main, or be placed in any other position where they will be exempt from being tampered with by unauthorized persons. The lower ends of the leakage-pipes 5 are preferably inserted in bodies of loose packing 2 formed of fragments of stone or metal, coarse gravel, or any other material which will provide a series of intercommunicating interstices, so as to prevent the ends of the pipes becoming clogged up with earth and to afford avenues for directing the escaping gas into the leakage-pipes, and the sections of the main 1 may be surrounded by tight packing 11, of clay, cement, or other material which will resist the passage of gas along the outside of the pipe and induce the escape of the same through the loose packing 2 and pipes 5.

In operation, if it be found by testing the detector-pipe that a leak exists at any point of the main within the range of the section of conducting-pipe 9, the earth may be removed from above the couplings 7, and by withdrawing the screw-caps the location of the leak can be readily ascertained. The couplings being covered by a comparatively-shallow body of earth, the necessary excavation may be expeditiously made and refilled, and, if deemed desirable, the couplings may be inclosed in boxes 10, having movable covers, or a short pipe may be extended to the surface and provided with a plug, so as to obviate the necessity of any excavation.

I claim herein as my invention—

1. The combination of an underground gas-main, a line of waste-gas-conducting pipe, a series of leakage-pipes extending from points adjacent to the main to the conducting-pipe, and a detector-pipe leading from the conducting-pipe to a point above the level of the ground, substantially as set forth.

2. The combination of an underground gas-main, a line of waste-gas-conducting pipe laid above said main, a series of leakage-pipes extending from points adjacent to the main to the conducting-pipe, a detector-pipe leading from the conducting-pipe to a point above the level of the ground, and a series of removable caps or plugs, each secured in an opening in the conducting-pipe adjacent to one of the leakage-pipes, substantially as set forth.

3. The combination, with the conducting-line, of a coupling, a downwardly-extending socket-pipe connected thereto, a leakage-pipe fitting freely within the socket-pipe, and a removable cap or plug secured in the coupling above the socket-pipe, substantially as set forth.

4. The combination of an underground gas-main, bodies of loose packing having a series of intercommunicating recesses and surrounding joints or branch-connections in the main, a series of leakage-pipes, each extending from one of said bodies of loose packing to a line of waste-gas-conducting pipe, a detector-pipe leading from said conducting-pipe to a point above the level of the ground, and a series of bodies of tight packing surrounding the sections of the main between the bodies of loose packing thereof, substantially as set forth.

In testimony whereof I have hereunto set my hand.

GEO. WESTINGHOUSE, JR.

Witnesses:
   J. SNOWDEN BELL,
   R. H. WHITTLESEY.